INVENTOR.
MANLEY RUSSELL SEELHOFF

Patented Feb. 9, 1954

2,668,618

UNITED STATES PATENT OFFICE 2,668,618

COMMUTATOR TESTING APPARATUS

Manley Russell Seelhoff, Owosso, Mich., assignor to Redmond Company, Inc., Owosso, Mich., a corporation of Michigan Application April 29, 1948, Serial No. 24,055

4 Claims. (Cl. 209—81)

This invention relates to testing methods and apparatus, and particularly to the testing of electric current conducting elements, such as rotary switches or commutators.

An object of the invention is to provide a novel method of testing a quantity of such elements, one after another, in rapid succession, to determine the presence of any flaw which would interfere with their proper performance of their electrical functions.

A second object of the invention is to provide novel apparatus for successively testing a quantity of current conducting elements, to determine their capacity to conduct current according to a desired pattern of operation.

While the invention is herein described and illustrated as applied to the testing of cylindrical commutators such, as are commonly used in small electric motors, it is to be understood that such description and illustration are by way of example only; the principles of the invention, as defined in the appended claims, being applicable to the testing of many other electrical elements and components, as will be apparent when the entire disclosure is considered.

In addition to testing a quantity of commutators or other electrical units, as they are successively fed to a testing station, the invention also includes the automatic sorting of the units according to their ability to meet the requirements upon which the testing procedure is based.

Other objects and features of the invention will suggest themselves as the following description is read in conjunction with the accompanying drawing wherein:

Fig. 4 is a perspective view of the type of commutator for which the illustrated testing apparatus is adapted.

Figure 1:
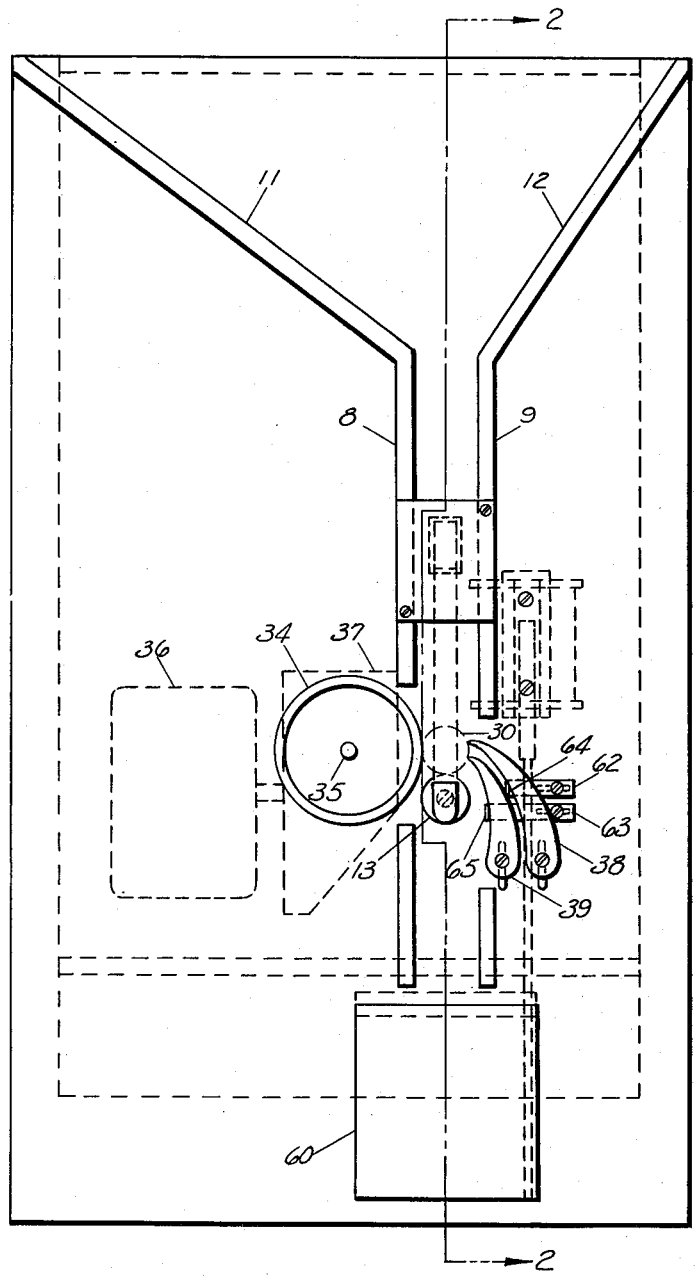
Fig. 1 is a plan view of apparatus by which the invention may be applied to the testing of commutators or other rotatable circuit controllers.
Figure 2:
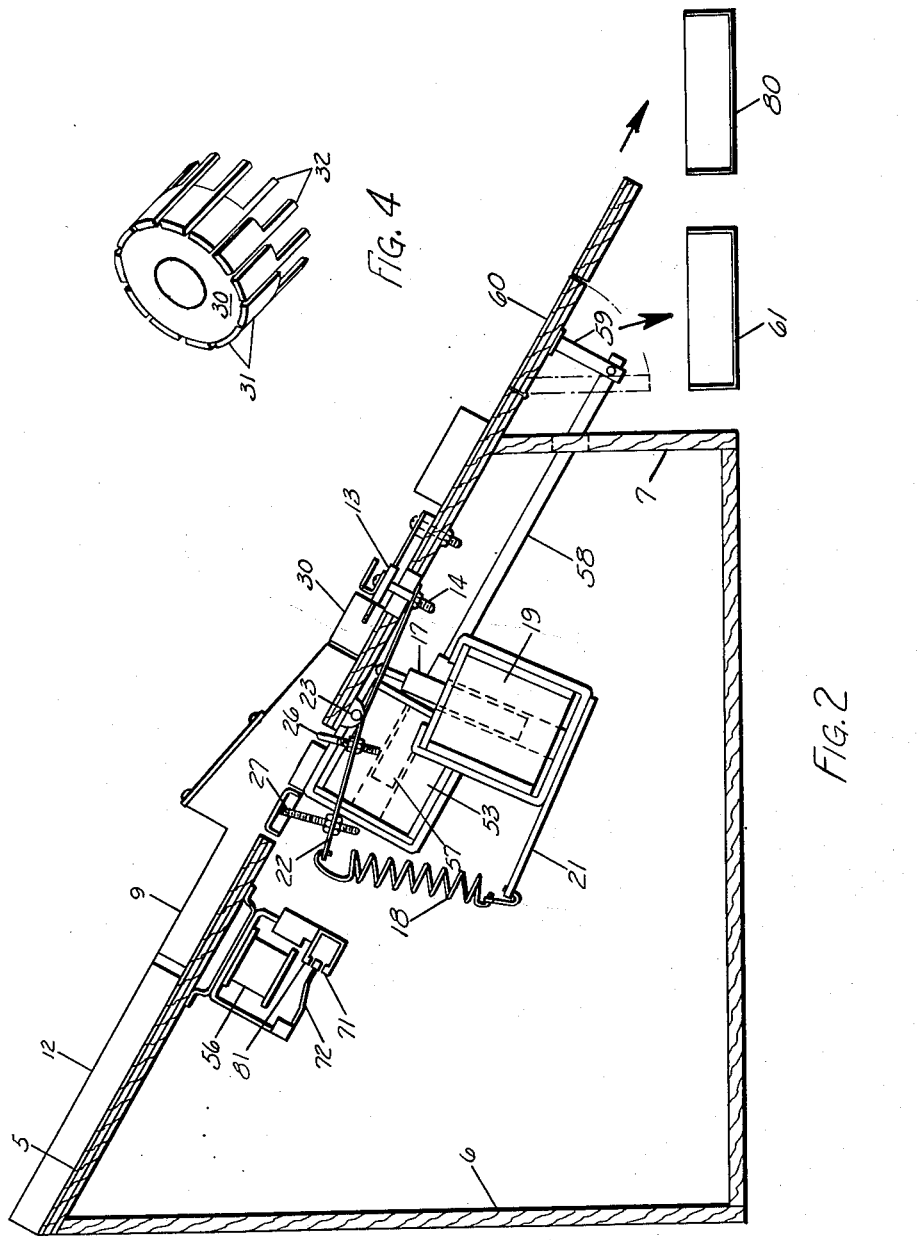
Fig. 2 is a sectional view along line 2—2 of Fig. 1.

In Figs. 1 and 2 there is shown a box-like structure having an upper surface 5 resting on a pair of end walls 6 and 7 of different height, whereby the surface 5 is tilted at an angle of thirty or more degrees, so that the parts to be tested and sorted may slide easily over said surface, when permitted to do so.

Guide strips 8, 9, provide a channel into which the cylindrical commutators or other parts to be tested are directed by the action of the converging guides 11, 12, when a quantity of such commutators are dropped upon the surface 5, in the area between said guides 11, 12. The first of the commutators (whose diameters are slightly less than the spacing of the strips 8, 9) slides along the central channel until it encounters an obstacle in the form of a circular stop 13 freely rotatable on a spindle 14 (Fig. 2) the latter being reciprocable to a limited extent in an opening cut through the surface 5. As the leading commutator is stopped by bearing 13, the following units, of course, are also stopped in successive positions along the channel, to the rear of the leading commutator.

Reciprocation of spindle 14 is brought about by the alternate action of a plunger 17 and a tension spring 18, the former being a part of a solenoid 19, while the spring 18 has one end secured to the solenoid bracket 21 and the opposite end to a rocker arm 22 to which the plunger 17 also connects, but on the opposite side of pivot 23. Two posts 26, 27 are adjustably mounted on the arm 22 and project through spaced openings in the sloping floor 5, to cooperate with bearing stop 13 in the control of the feeding of successive commutators down the channel, as will appear more fully hereinafter.

As indicated in Fig. 4, small motor commutators are commonly formed by making a series of longitudinal cuts through a metallic cylinder 30, to form a circumferentially arranged series of individual commutator segments, or "bars" 31, each bar having rearwardly extending lug 32 to which an armature conductor can subsequently be secured. In the finished motor, of course, each bar 31 must be electrically separated from its adjacent bars, for proper commutation of the applied current, that is, to secure the desired torque reaction through periodic magnetic field reversals. In forming a commutator in this fashion—that is, by cutting slots through a metallic cylinder at spaced intervals—it occasionally happens that burrs or metallic particles cling to successive bar edges, thus creating a continuous metallic path through which current could flow directly from one bar to the bar adjacent thereto, if such a defective commutator were to be assembled into a complete motor. It is accordingly desirable to detect such a defect and to discard the defective unit. The detection and discarding are accomplished by the novel method herein disclosed.

Figure 3:
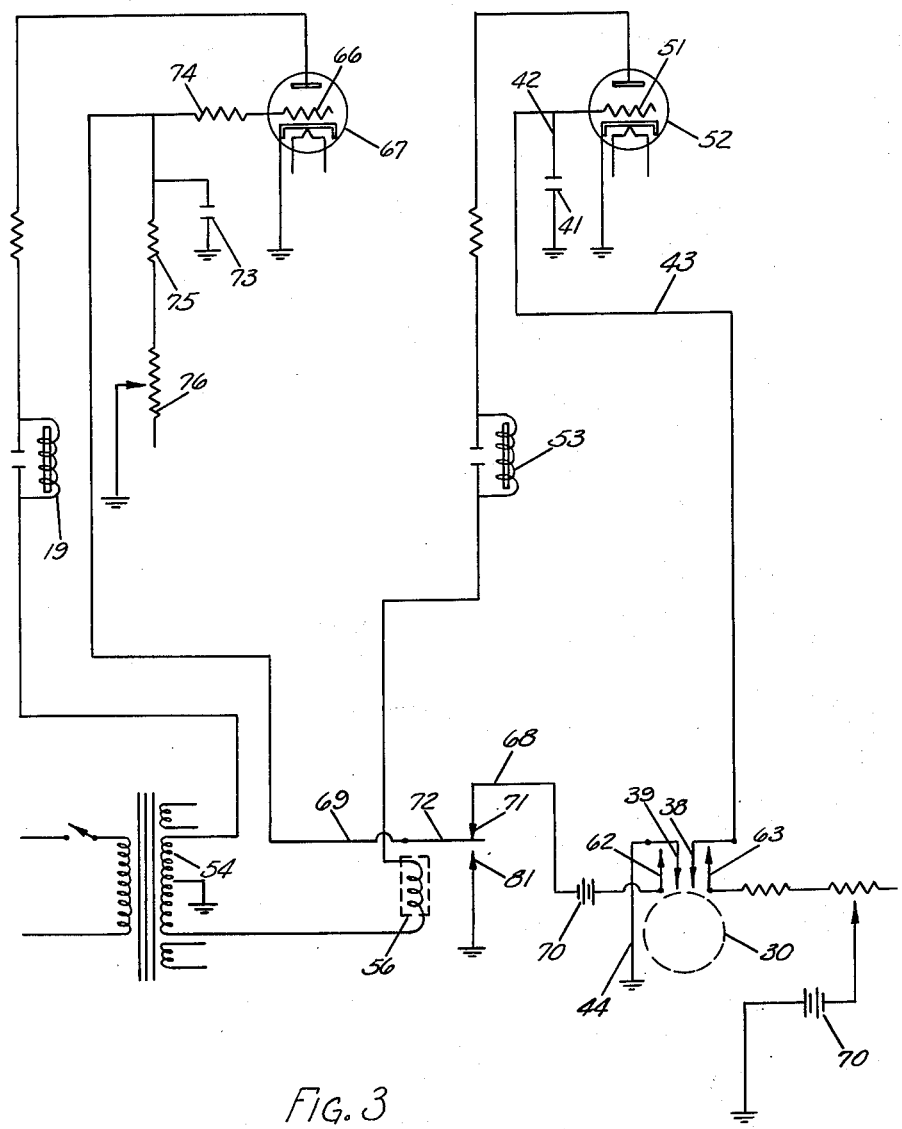
Fig. 3 is a diagram of electrical connections.

As illustrated, the method just referred to is practiced by mounting a rubber-tired wheel 34 on the upper end of a shaft 35 projecting through the floor 5, the said shaft 35 being driven by constantly operating motor 36, through a reduction gear train 37, and positioned so that the peripheral tire frictionally engages and rotates the commutator to be tested, as the latter comes into position against rotatable stop 13; the proper degree of frictional driving pressure being assured by causing two metallic fingers 38, 39 to be spring-biased to bear against the commutator at spaced peripheral points, each of which points is nearly 180 degrees removed from the point of tangency of drive wheel 34. The distance between the two fingers, at their tips, is exactly equal (or nearly so) to the distance from center-line to center-line of two successive commutator bars, therefore there is no possibility of current flow from finger 38 to finger 39 by way of a single commutator bar. On the other hand, if a defect in the structure of the commutator is present, so that a current path actually exists between two successive bars of the commutator, the arrival of said two bars into positions of contact with the fingers 38, 39 respectively, will complete a circuit for the discharge of energy previously stored in a condenser 41 (Fig. 3); the discharge being by way of conductors 42 and 43, fingers 38 and 39, and conductor 44 to ground, all as shown in Fig. 3.

The novel method of discarding a commutator found to be defective will now be described. When a defect has been indicated by the closure of the condenser discharging circuit just traced, the resultant decrease in the negative voltage bias of grid 51 permits the tube 52 to become effective, and as current flows there-through the solenoid 53, in series therewith, is energized from the energy source (transformer secondary) indicated at 54 in Fig. 3. Simultaneously the relay 56, which also is in series with tube 52, is energized, for a purpose to be explained hereinafter.

Energization of solenoid 53 establishes a pulling force sufficient to retract the plunger 57 (Fig. 2) and, with it, the links 58 and 59. As trap door 60 is hinged to swing upwardly when link 59 is retracted, it will be apparent that the commutator under test, assuming it to be released for gravity descent at this moment, will drop through the opening created by the swing of the trap door to its upper position. Upon so dropping, the defective commutator will be received in the "reject" box 61.

The novel means for releasing the commutator under test, after it has been rotated sufficiently (by wheel 34) to establish the presence or absence of a defective current path, such as above described, includes a pair of stationary contact strips 62, 63 having flanges 64, 65, respectively, against which the fingers 38, 39 are biased by spring pressure when not otherwise influenced. Contact 62 is in series with the grid 66 of tube 67 (Fig. 3) by way of conductors 68 and 69, and normally closed contacts 71, 72. Also connected to said grid circuit are supply batteries 70, a condenser 73 and resistors 74, 75, and 76, the latter being adjustable to regulate the time interval between arrival of a commutator into contact with fingers 38, 39, and the release thereof by retraction of stop 13.

The releasing cycle is as follows: As the fingers 38, 39 are pressed away from the flanges 64, 65 by the arrival of a commutator thereagainst, the normal grid circuit is interrupted, permitting condenser 73 to discharge to ground by way of regulable resistor 76. The resultant change in grid voltage will render tube 67 operative, the interval for "firing" thereof depending upon the adjustment of resistor 76. As the tube 67 fires, solenoid 19 is energized to retract the stop 13 and permit the commutator just tested to slide down the chute into "accept" box 80 or "reject" box 61, depending upon whether or not the trap door 60 has opened—in other words, dependent upon whether or not a short-circuit developed, to cause a firing of tube 52 and a resultant energization of solenoid 53, as above explained.

As the tested commutator leaves the fingers 38, 39, these re-engage the flanges 64, 65, respectively, of contacts 62, 63, thus re-closing the grid supply circuit 70—62—39—68—71—72—69, and permitting a re-charging of condenser 73. The tube 66 ceases firing, solenoid 19 is de-energized, and spring 18 restores stop 13 to position to catch the next commutator to be tested. The cycle is then repeated.

As above noted, the relay 56 is energized whenever solenoid 53 is energized, that is, whenever there is a defective commutator to be routed through the trap door opening. The novel function of this relay 56, on such occasions, is to ground momentarily the circuit 69 from grid 66 and condenser 73, by way of grounded relay contact 81, which is engaged by relay armature 72 as this action occurs. The resultant re-discharge of the condenser 73 delays the de-energization of solenoid 19, and thus holds stops 26 and 27 in their upper positions to prevent a second commutator from sliding down the chute until the solenoid 53 has had sufficient time to fully de-energize and thereby permit return of the trap door 60 to the closed position. Following such closure of the trap door, spring 18 will become effective to retract stops 26 and 27, and simultaneously re-position stop 13.

What I claim is:

1. In apparatus for testing current-conducting units, a pair of testing elements engageable with a unit to be tested, means including a prime mover and a rotating transmission means separate and distinct from the unit to be tested for causing said unit to traverse a complete cycle of operation while engaged by said testing elements, an electrical circuit for controlling the release of said unit from its engaged position, said circuit including a switch operated by one of said testing elements, said circuit being closed at said switch by said one of said testing elements in the absence, and being opened at said switch by said testing element in the presence, of a unit in the engaged position, and means retardedly responsive to the opening operation of said circuit to release said unit from its engaged position.

2. In the apparatus of claim 1, a second circuit, said second circuit including said testing elements, said second circuit being normally open but being closable by the unit being tested, in the event of an electrical defect therein, during operation of said transmitting means, and means responsive to closure of said second circuit to divert said tested unit to a position indicating it to be defective.

3. In apparatus for testing rotatable current-conducting commutator units prior to attachment of said units to the armatures with which they are ultimately to be associated, a testing element engageable with a unit to be tested, an electrical circuit for controlling the release of said unit from its engaged position, said circuit including a switch operated by said testing element, means for biasing said testing element into position to close said circuit at said switch, said circuit being openable notwithstanding said biasing means by the presence of the unit to be tested in the engaged position, and means responsive to opening of said circuit to release said unit from its engagement with said testing element, said last named means including adjustable time delay mechanism forming part of said electrical circuit to insure completion of the testing cycle prior to such release.

4. In an apparatus for testing commutator units, a test station, means for feeding commutator units to the station, a continuously operating means at the station for rotating the unit about its axis, a pair of electrical contact elements spaced from the rotating means, and resiliently biased towards said means so as to be displaced by the feeding of the unit to said station, a circuit connected to said contacts for electrically testing the electrical continuity of the unit during rotation, means for releasing the unit from the station including an electrical circuit having an electronic timing unit actuated by said bodily displacement of the contact elements, for discharging the unit after a predetermined period of time.

MANLEY RUSSELL SEELHOFF.

References Cited in the file of this patent

UNITED STATES PATENTS

| Number | Name | Date |
|--------|------|------|
| 1,372,945 | Cullin | Mar. 29, 1921 |
| 1,412,051 | Gaalaas | Apr. 11, 1922 |
| 1,690,345 | Poole | Nov. 6, 1928 |
| 1,768,449 | Heiny | June 24, 1930 |
| 1,808,301 | Ferguson | June 2, 1931 |
| 1,842,810 | Whelchel | Jan. 26, 1932 |
| 1,971,426 | Poole | Aug. 28, 1934 |
| 2,220,489 | Lowkrantz | Nov. 5, 1940 |
| 2,229,638 | Chamberlin | Jan. 28, 1941 |
| 2,264,873 | Cockrell | Dec. 2, 1941 |